United States Patent Office 2,937,325
Patented May 17, 1960

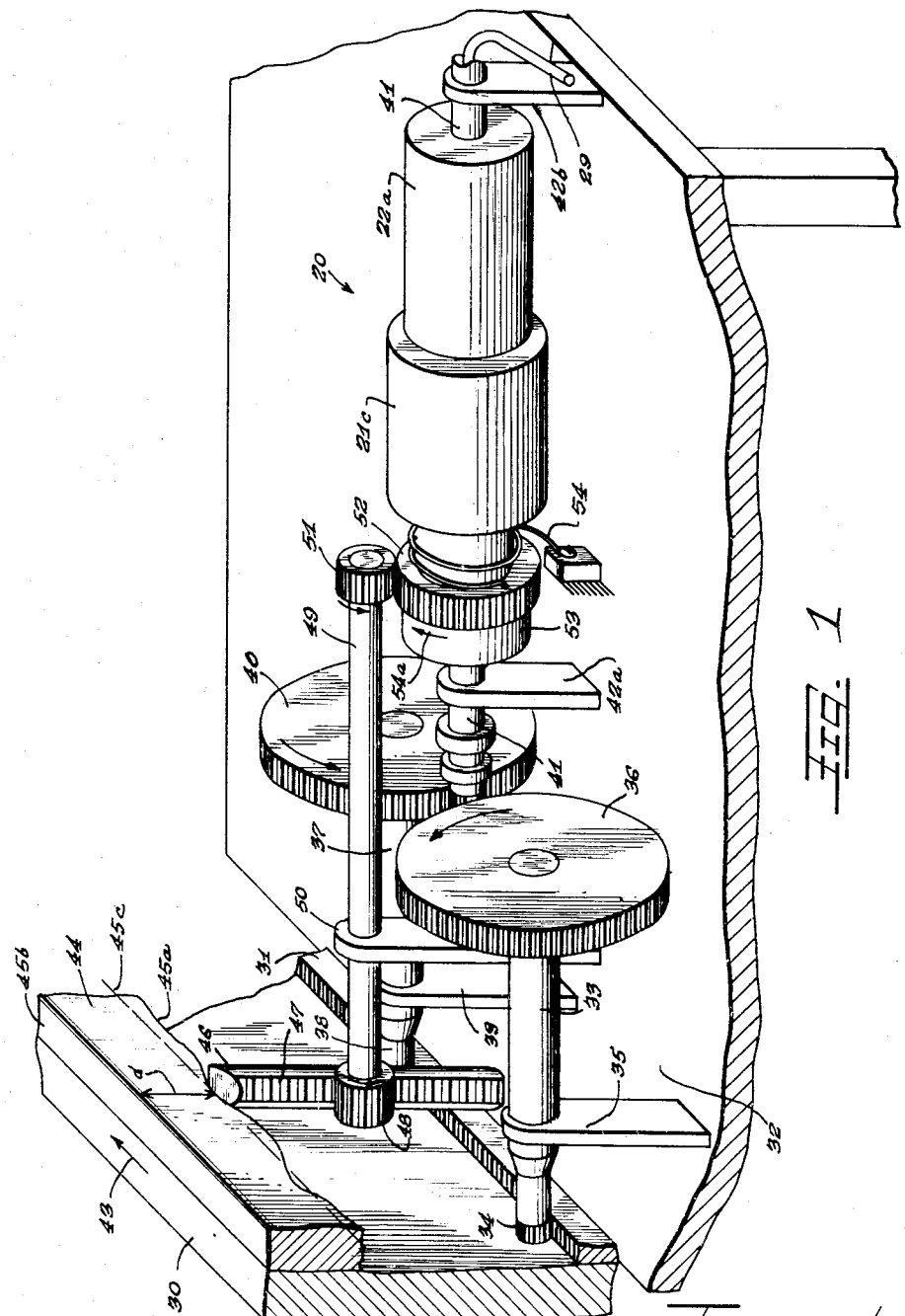

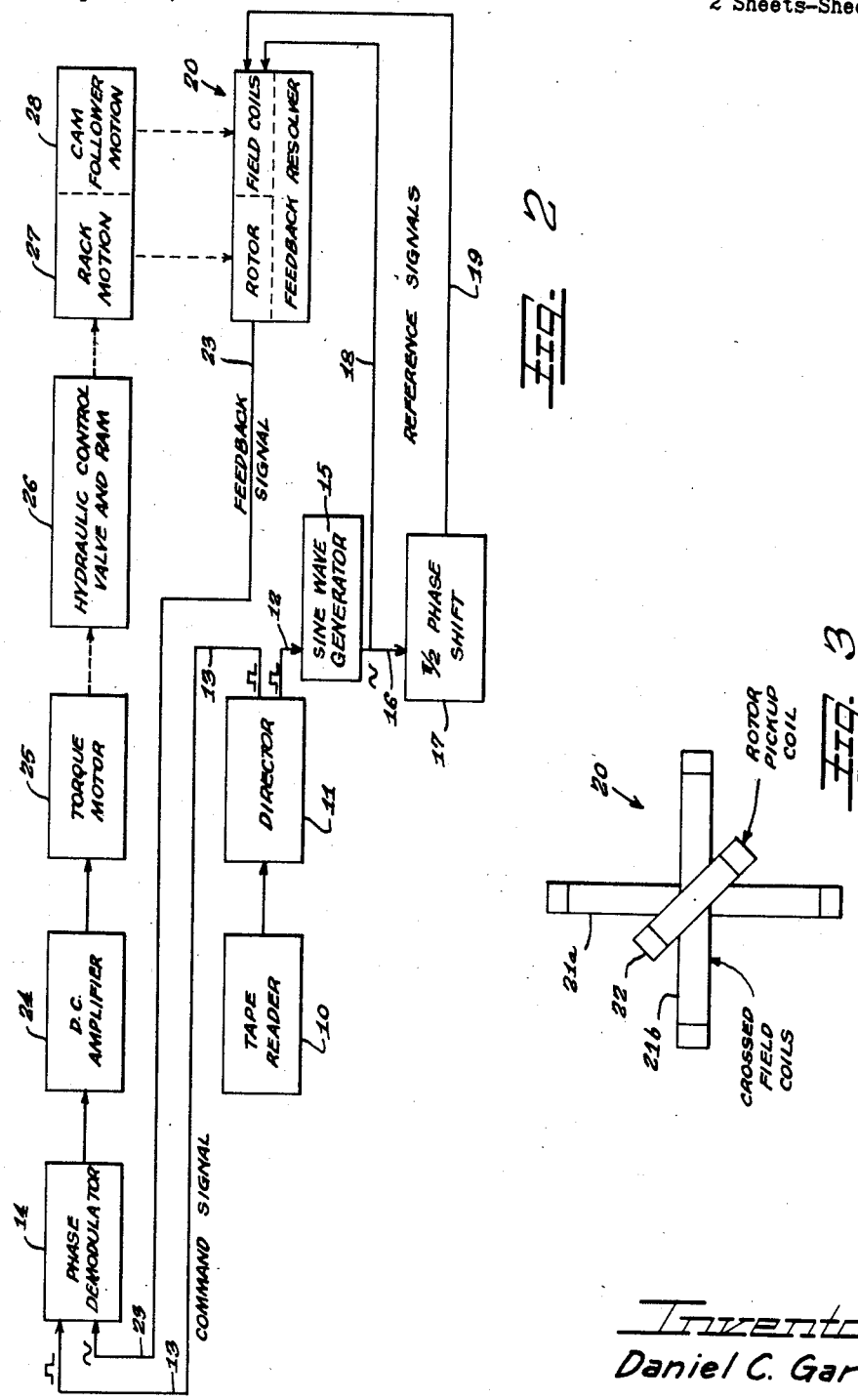

2,937,325

ERROR COMPENSATED SERVO-MECHANISM

Daniel C. Garber, East Cleveland, Ohio, assignor to Thompson Ramo Wooldridge Inc., a corporation of Ohio Application April 21, 1958, Serial No. 729,801

9 Claims. (Cl. 318—28)

This invention relates to motion measuring apparatus for use in servo-mechanisms. More particularly, this invention relates to an analogue servo-mechanism adapted to control the motion of a first movable member with respect to a second fixed member and being provided with means for compensating for regular and reproduceable errors in the measurement of the controlled motion.

Analogue servo-mechanisms are used in a wide variety of arts including, for example, the automatic machine tool control art. In one illustrative application, for example, a milling machine may be automatically controlled along one or more of its possible axes of motion by such a servo-mechanism. The servo-mechanism itself is in turn controlled by electrical signals applied thereto from a director which converts program information encoded on a tape or other storage medium to electrical signals suitable to actuate the servo-mechanism to control the milling machine in accordance with command or instruction information which has previously been computed and encoded in the storage medium. It will be apparent that the accuracy of the milling machine operation is dependent upon the accuracy with which the servo-mechanism responds to the signals provided by the director. Such a servo-mechanism must include some means for measuring the actual motion which has been produced by the input signals. This measuring means in turn produces a feedback signal which is compared to the input signal to stop the motion of the movable member when it has traveled the distance specified by the original electrical input signal. In practice, then, the accuracy of the entire system is dependent upon the accuracy with which the position or motion measuring device indicates the amount or degree of motion which has been produced.

It is, therefore, an object of this invention to provide an error-compensated device for measuring the motion of a first member with respect to a second member.

It is further an object of this invention to provide an analogue servo-mechanism for controlling the motion of a first member with respect to a second member which servo-mechanism includes apparatus for compensating for regular and reproduceable errors in the measurement of such motion.

It is a more specific object of this invention to provide in an analogue servo-mechanism controlling the motion of a first movable member with respect to a second fixed member a feedback resolver, the rotor coil of which is actuated by a rack and gear arrangement to afford a nominal measurement of the motion produced and the field coils of which are actuated by a cam and cam-follower arrangement to compensate for errors in the measurement afforded by the actuation of the rotor coil.

In general, in accordance with one exemplary preferred embodiment of the invention, a servo-mechanism is provided comprising a phase modulator or detector which produces an output signal, the amplitude of which is proportional to the phase difference between two input signals applied thereto. The output of the phase demodulator actuates a torque motor which may drive a first movable member of any suitable machine through such means as a hydraulic control valve and ram or any other suitable mechanical arrangement. The motion of this first member is measured by a feedback resolver, the rotor coil of which is driven through gearing actuated by a rack rigidly attached to the first movable member. The amount of motion desired is specified by the phase difference between a first phase modulated command signal applied directly to the phase demodulator and a second unmodulated reference signal applied to the field coils of the feedback resolver. A feedback signal is derived from the rotor coil of the resolver and is applied as the second input signal to the phase demodulator. When the amount of motion specified in the input command has been completed, the rotation of the rotor will produce a phase shift in the feedback signal with respect to the reference signal actuating the field coils of the resolver which is equal to the phase difference originally existing between the reference signal and the input command signal. There will then thus be no phase difference between the signals applied to the phase demodulator, its output will be zero, and the motion of the movable member will stop. The foregoing mode of operation, however, assumes that all of the mechanical parts of the system, including the gearing driving the rotor coil of the resolver, are perfectly accurate and will, in fact, produce a motion of the rotor coil which is exactly proportional to the linear motion of the movable member. In practice, this is not normally the case, since regular and reproduceable errors will arise due to imperfections in cutting the gears or in shaping other mechanical portions of the system. In order to compensate for these regular and reproduceable errors, the present invention contemplates a cam which is also rigidly attached to the movable member and which is cut in such a manner that its shape is a measure of these regular and reproduceable errors. A cam follower is then arranged to be driven by this cam and in turn to drive the field coils of the feedback resolver in such a manner as to compensate in the phase shift produced in the feedback signal for these above noted errors so that the system will operate to actually produce the motion originally called for by the phase difference between the input command signal and the reference signal.

While the novel and distinctive features of the invention are particularly pointed out in the appended claims, a more expository treatment of the invention, in principle and in detail, together with additional objects and advantages thereof, is afforded by the following description and accompanying drawings in which like reference characters are used to refer to like parts throughout and wherein:

Figure 1 is a fragmentary perspective view showing the feedback resolver used in the present invention and the manner in which its rotor coils are driven by a rack actuated gear train and in which its field coils are driven by a cam and cam follower arrangement.

Figure 2 is a block diagram of a typical servo-system embodying the present invention.

Figure 3 is a schematic diagram illustrating the relationship of the field coils and rotor coils of a feed-back resolver of the type used in the present invention.

Turning now to the drawings, and in particular to Figure 2 thereof, there is shown a block diagram of the error-compensated servo-mechanism of the present invention as it may typically be used in an automatic machine tool control system. In this illustrative embodiment of the invention, a tape reader 10 reads a series of commands from a previously computed program specifying the motions to be carried out by a controlled machine such as a milling machine. The information read from the tape is applied to a director 11 which has as its output a first reference signal appearing on line 12 and a second command signal appearing on line 13. These signals may typically be square or rectangular waves which represent by the phase difference between them the amount of motion specified for the particular command which has been read from the previously computed program by the tape reader 10. The command signal is applied over line 13 as one input to a phase demodulator 14. The reference signal is applied over line 12 to a sine wave generator 15 which may conveniently be either a filter tuned to the fundamental or first harmonic frequency of the signal appearing on line 12 or which may alternatively be a sine wave oscillator which is controlled with respect to its phase by the square wave signal on line 12.

The output of the sine wave generator 15 is applied over line 16 to a phase shift network 17 which produces a 90° or $\pi/2$ phase shift in this signal. The output of sine wave generator 15 is also applied over line 18 directly to one of the field coils of a resolver 20. The output of the phase shift network 17 is applied over line 19 to another of the field coils of resolver 20.

The electrical principles of operation of resolvers or phase shifters of the type suitable for use as resolver 20 are in general well known. For example, resolver 20 may be a phase shifter of the type disclosed and described in connection with Figure 56(c) on page 949 of the book entitled, "Radio Engineer's Handbook" written by F. E. Terman, and published by the McGraw-Hill Co., Inc., New York, New York, first edition, 1943. Such resolvers in general comprise a pair of crossed field coils 21a and 21b (as best seen in Figure 3) and a rotor coil 22.

In the known mode of operation of these resolvers, the field coils are held stationary in a stator assembly and are excited by electrical signals which are 90° out of phase from each other. The phase of the electrical output signal which may then be derived over a line such as the line 23 from the rotor coil within the field of the crossed field coils, will then be determined by the relative angular position of the rotor coil 22 which is mounted on a shaft to be rotated with respect to the field coils. Thus, the phase of the output signal derived from rotor coil 22 is a measure of the amount of angular rotation of the shaft driving or rotating the rotor coil 22.

It will, of course, be understood that in the present invention, such known resolvers are modified as shown in Figure 1 by providing not only a shaft means to drive the rotor coil housing 22a and rotor coil 22 mounted therein, but also by providing a cam actuated means to drive or rotate the housing 21c in which the stator coils are rigidly mounted. The rotation of the stator or field coils is used to compensate for errors in the primary measuring function of the rotor coil in a manner which will be discussed below. For the present, however, let us assume that the cam position is such that no rotation of the stator or field coils is produced. In this instance, the feedback signal derived over line 23 from the rotor coil 22 will be a sine wave which has a phase with respect to the reference signal sine wave on line 16 which is determined by the position of the rotor coil. As the rotor is turned by motion of the movable member, this phase will be shifted and the degree of phase shift will provide a nominal measurement of the motion of the movable member driving the shaft which rotates the rotor. This feedback signal on line 23 is applied to another input of the phase demodulator 14.

Phase demodulator 14 may be provided at its input stages with means to produce a phase equivalent square wave from the sine wave applied over line 23 or with means to produce from the square wave applied over line 13 a phase equivalent sine wave. The phase demodulator 14 may further comprise any known circuitry for deriving a unidirectional or direct current output voltage which is zero when the two input signals to the phase demodulator are in phase (that is to say, when the cycles of each respective signal begin at precisely the same time) and which further has a magnitude and polarity which are respectively proportional to the amount and kind (leading or lagging) of phase difference between the reference feedback signal applied over line 23 and the input command signal applied over line 13.

The output signal from the phase demodulator 14 is applied to a D.-C. amplifier 24, the output of which in turn drives a torque motor 25 which may actuate any convenient means such as a hydraulic control valve and ram arrangement 26 for producing the motion of the first movable controlled member which in turn produces the rack motion indicated by block 27 and the cam follower motion indicated by block 28. In Figure 2, electrical connections have been indicated by solid lines and mechanical connections have been indicated by dash lines.

One particular arrangement for simultaneously measuring this produced motion and compensating for errors in this measurement is shown in Figure 1 of the drawing. In Figure 1, the electrical connections indicated by lines 18, 19 and 23 in Figure 2 are shown schematically by the cable 29 leading to and from the resolver 20.

In Figure 1, a geared rack 31 is rigidly attached to move with a first movable member 30 and to actuate mechanism to measure the motion of member 30 with respect to a fixed or stationary member 32. Movable member 30 may, for example, be the work holding table of a milling machine or other machine tool, whereas fixed member 32 is the frame of the machine. A shaft 33 having gear teeth 34 at one end which mesh with and are driven by the teeth of rack 31 is mounted for rotary motion in any convenient support member 35 and carries a gear wheel 36 at the opposite end thereof. A second similar shaft 37 also has a geared end 38 (of the same diameter as gearing 34) which meshes with and is driven by the teeth of rack 31 and is mounted for rotary motion in any convenient supporting member 39 and carries a geared wheel 40 at the other end of the shaft. Gear wheels 36 and 40 are of the same diameter and have the same size gear teeth and are connected to drive the geared end of a shaft 41 on which the rotor coil is mounted. Shaft 41 is supported by any convenient support members 42a and 42b and carries the resolver housing 22a rigidly attached thereon in a manner which will be described below.

It will be first noted that if the table or movable member 30 moves in the direction of the arrow 43, the rack 31 will also be moved in this direction and will thus rotate the shaft 33 so as to rotate the gear wheel 36 in the direction of the arrow shown thereon. Similarly, shaft 37 will rotate the gear wheel 40 in the direction of the arrow shown thereon. Shaft 41 will therefore be rotated in a clockwise direction and will turn the rotor coil 22 within the rotor housing 22a by an amount which is determined by the length or magnitude of the motion of member 30 and the gear ratio of the driving arrangement described above.

It will, of course, be realized that the two gear wheels 36 and 40 arranged as shown are used to prevent backlash in the driving motion and that these gear wheels may be spring-loaded in a manner well known in the art in order to further increase the accuracy of the drive if desired. No matter how carefully the gear mechanism is made, however, there will be some small irregularities which cause reproduceable errors in the accuracy with which the phase shift produced in the signal derived from the rotor coil measures the linear motion of member 30.

To build the apparatus of the present invention, the system as described above, that is to say, with stator coils fixed and the movement measured entirely by the actuation or rotation of the rotor coil, is operated as such and these errors are measured by comparing the actual motion of member 30 as measured by gauge blocks or other suitable, highly accurate measuring instruments with the motion specified by the input command. In this calibration procedure, a command specifying a predetermined distance through which the movable member 30 is to be moved is read from tape reader 10 and an appropriate signal provided by the director 11 to the servo system described in connection with Figure 2. The actual distance through which the member 30 has moved is then measured by the above noted gauge block technique or any other similar, highly accurate measuring technique. It is found that when this is done, reproduceable errors depending upon the initial position of movable member 30 will recur and may be accurately noted.

In order to compensate for these errors, a cam 44 having a bottom surface 45a and a top surface 45b, as shown in Figure 1, is cut so that the deviation from a standard depth $d$ between top surface 45b of the cam and dashed line 45c is proportional to the magnitude and polarity of recurring or reproduceable errors in the movement of the apparatus. This cam is then rigidly attached to movable member 30. A cam follower 46 is then positioned to be movable vertically in a plane fixed with respect to fixed member 32. Of course, standard depth $d$ could also be taken between line 45c and any other suitable horizontal reference plane which is parallel to the motion of movable member 30.

Cam follower 46 may be constrained for such motion by any suitable supporting means. It may, for example, project downwardly through a recess or aperture in fixed member 32 which contains suitable bearing means. Cam follower 46 has gear teeth 47 cut on one vertical side thereof. Teeth 47 mesh with teeth 48 of a pinion gear mounted on one end of a shaft 49. This shaft 49 may be supported by any suitable bearing or journal means 50 and has a second pinion gear 51 rigidly attached to the other end thereof. Pinion gear 51 drives a ring gear 52 which is rigidly attached to a hollow reduced shaft portion 53 extending from the housing 21c of the stator or field coils of the resolver. It will be understood that member 53, ring gear 52, housing portion 21c and the field coils attached to the interior thereof rotate as a unitary assembly when driven by pinion gear 51. This unitary assembly is journalled by any suitable bearing means for rotation about the housing 22a of the rotor coil 22 and about the shaft 41 to which the rotor coil housing is rigidly attached A stop and spring arrangement 54 is provided to bias the gear ring 52 in the direction shown by the arrow 54a associated therewith. This in turn tends to rotate pinion gear 51 in the direction of the arrow shown attached thereto. This in turn, of course, rotates pinion gear 48 in the same direction and thereby urges the cam follower 46 upwardly against the under surface 45a of cam 44 against the normal force of gravity.

If the under surface of cam 45a were perfectly horizontal as indicated by the dashed line 45c, transverse motion of member 30 and cam 44 would not move the cam follower and the field coils would remain stationary. Insofar as there are no errors to be compensated for, this is the normal mode of operation. That is to say, the dash line 45c indicates the depth of the cam for the standard from which error corrections are made. The actual surface 45a, as noted above, is cut to a depth greater than or less than that indicated by the line 45c in order to compensate for regular and reproduceable errors in the gear mechanism of the device.

In the operation of the apparatus of the present invention, the servo system shown in Figure 2 actuates the movable member 30 by a command which calls for a predetermined length or degree of motion. A nominal measurement of this motion is made by the gear wheels 36 and 40 which rotate the shaft 41 to drive or rotate the rotor coil 22 through an angle proportional to the distance traveled by member 30. The rotation of rotor coil 22 introduces a phase shift into the feedback signal applied over line 23 to the phase demodulator 14. When this phase shift is equal to the original phase difference existing between the command signal applied to phase demodulator 14 over line 13 and the reference signal applied over line 12 to the field coils of the resolver 20, the phase difference becomes equal to zero and the phase demodulator having a zero output stops the motor driving or controlling the motion of movable member 30. As noted above, however, the actual rotation of the rotor coil 22 is in practice only nominally proportional to the distance traveled by member 30 due to regular, reproduceable or recurring errors caused by slight inaccuracies in the gearing system. The cam 44 which has been cut to a variable depth in the manner described above is used to compensate for these regular and recurring errors. Thus, as the member 30 moves, it carries cam 44 with it and cam follower 46 rides up and down vertically by an amount determined by the shape of surface 45a. This motion of cam follower 46 is transmitted through shaft 49 and gearing 51 and 52 to rotate the field coils or stator coils 21a and $b$ of resolver 20 either clockwise or counter-clockwise so as to compensate for positive or negative errors in the nominal measurement by rotating these field coils so as to produce an additional increment of phase shift in the output feedback signal in line 23 with respect to the reference signal on line 16. To take an exaggerated example, if the rotor gear drive mechanism is such as to produce a phase shift equal to the phase modulation of a command calling for 1 inch of motion only after member 30 has actually moved 1.1 inches, the surface of cam 44 will be cut so as to rotate the field coils in such a manner that the desired phase shift will be produced when member 30 has actually moved exactly 1 inch.

Of course, it will be understood that the polarities involved, that is to say, whether the cam 44 must be cut above or below the line 45c in order to compensate for positive or negative errors respectively, will depend upon the manner of the relative winding of the rotor coil and field coils respectively as will be apparent to those skilled in the art. The selection of one or the other appropriate polarity convention is thus purely a matter of choice which may be adapted to the convenience of any particular application.

It will further be noted that although the resolver 20 and its error-compensating connections have been shown in Figure 2 in one typical application as a component in a servo system, this same apparatus and technique could, obviously, be used simply to provide an electrical signal which affords a measure of the motion of member 30 without necessarily being connected in a feedback loop to control this motion. Thus, if the output of the phase demodulator is applied to a meter or other indicating device rather than to the amplifier 24 driving motor 25, and if the member 30 is driven by some wholly independent means, then it will be apparent that the magnitude and polarity of the output of phase demodulator 14 will afford an error-compensated measurement of the motion of member 30.

While the principles of the invention have now been made clear, there will be immediately obvious to those skilled in the art many modifications in structure, arrangement, proportions, the elements and components used in the practice of the invention and otherwise, which are

I claim as my invention:

1. A servo-mechanism for moving a first movable member a predetermined distance with respect to a second fixed member comprising, a phase demodulator having an output signal the polarity and amplitude of which are determined by the phase difference between first and second input signals applied to said phase demodulator, means controlled by said output signal to move said first member a distance proportional to the amplitude of said output signal, a resolver fixed in position with respect to said second member and having field coils and a rotor coil, means to apply reference signals of fixed phase relation to said field coils, means to apply a command signal which is phase modulated with respect to said reference signals to said phase demodulator as its first said input signal, means to apply an output signal derived from said rotor coil of said resolver to said phase demodulator as its second said input signal, first gear means connected to rotate said rotor coil through an angle nominally proportional to the distance moved by said first movable member, a cam rigidly attached to said first movable member, a cam follower positioned to move in a plane fixed with respect to said second member by an amount determined by the shape of said cam, second gear means connecting said cam follower to rotate said stator coils by an amount proportional to the distance moved by said cam follower, said cam being cut in such a shape as to produce motions of said cam follower and said field coils which compensate for regular and reproduceable errors in the amount by which said rotor is actuated by said first gear means.

2. In an analogue servo-mechanism connected to move a first movable member a distance with respect to a second fixed member which is proportional to the phase difference between first and second input signals applied to a phase demodulator in said servo-mechanism, the improvement comprising, a resolver having field coils and a rotor coil, means to apply a phase reference signal to said field coils of said resolver and means to derive said first input signal to said phase demodulator from the rotor coil of said resolver, means to apply said second input signal directly to said phase demodulator, gear means to rotate said rotor coil by an amount which is nominally proportional to the distance moved by said first movable member, a cam rigidly attached to said first movable member and cut in a shape proportional to regular and reproduceable errors in the amount by which said first movable member is moved by said servo-mechanism in response to rotation of said rotor coil, a cam follower positioned to ride along said cam, means connecting said cam follower to rotate said field coils by an amount determined by the shape of said cam so as to compensate for regular and reproduceable errors in the motion of said first member by modifying the phase of said first input signal derived from said rotor coil of said resolver.

3. Apparatus for measuring motion by phase modulating an electrical signal to a degree proportional to the magnitude of the mechanical motion of a first movable member with respect to a second fixed member comprising, a resolver having field coils and a rotor coil, said field coils and said rotor coil being mounted for independent rotation about a common axis fixed with respect to said fixed member, means to apply an input reference signal to said field coils, means to derive an output signal from said rotor coil, means to rotate said rotor coil by an amount nominally proportional to the motion of said first movable member with respect to said second fixed member, means to rotate said field coils by a predetermined amount to compensate for regular and reproduceable errors in the amount by which said rotor coil is rotated in response to the motion of said first movable member, and means to compare the phase of said output signal derived from said rotor coil to the phase of a signal of known phase with respect to that of said reference signal to measure the actual amount of movement of said first movable member.

4. Apparatus for measuring the motion of the table of a milling machine with respect to the frame of said machine comprising, a resolver having a rotor coil and field coils mounted for independent rotation about a common axis fixed with respect to said frame, gear actuated means to rotate said rotor coil by an amount nominally proportional to the motion of said table with respect to said frame, a cam rigidly attached to said table to move with said table, said cam being cut to a depth proportional at each point longitudinally of said table to the magnitude of regular and reproduceable errors in the amount by which said gear means rotates said rotor, a cam follower mounted for motion having a magnitude proportional to the shape of said cam, means actuated by said cam follower to rotate said field coils by an amount proportional to the motion of said cam follower, means to apply a reference signal to said field coils, means to derive an output signal from said rotor coil, and means to compare the phase of said output signal to a command signal as a measure of the motion of said table.

5. Apparatus for measuring the motion of a first movable member with respect to a second fixed member comprising, a resolver having a rotor coil and field coils both mounted for independent rotation about an axis fixed with respect to said second member, a geared rack attached to said first movable member, gear means actuated by the motion of said rack to rotate said rotor coil by an amount which is nominally proportional to the motion of said first member, a cam rigidly attached to said first member, said cam being cut to a depth which is proportional to the magnitude of regular and reproduceable errors in the amount by which said gear means rotates said rotor coil, a cam follower having gear teeth cut in one side thereof, means mounting said cam follower for motion the magnitude of which is determined by the depth to which said cam is cut, means driven by the motion of said cam follower for rotating said field coils by an amount proportional to the depth to which said cam is cut, means to apply a reference signal to said field coils, means to derive an output signal from said rotor coils, and means to compare the phase of said reference signal and said output signal as a measure of the motion of said first movable member.

6. In an automatically controlled milling machine having a fixed frame and a movable table, a phase demodulator connected to actuate motor controlled means for moving said table with respect to said frame, means to apply a command signal to said phase demodulator, a resolver having a rotor coil and field coils both mounted for rotation about a common axis fixed with respect to said frame member, a geared rack attached to said table, gear actuated means driven by said rack for rotating said rotor coil by an amount nominally proportional to the magnitude of motion of said table, a cam rigidly attached to said table, said cam being cut to a depth proportional to regular and recurring errors in the amount by which said gear means rotates said rotor coil in response to motion of said table, a cam follower mounted to be moved through a distance proportional to the depth to which said cam is cut, gear means driven by the motion of said cam follower to rotate said field coils, means to apply a reference signal to said field coils, means to derive a feedback signal from said rotor coil, means to apply said feedback signal to said phase demodulator to compare the phase of said feedback signal to the phase of said command signal, said phase demodulator actuating said motor in accordance with the difference in phase between said feedback signal and said command signal.

7. In an analogue servo-mechanism connected to control the motion of a first movable member with respect to a second fixed member in accordance with the phase difference between a reference signal and a command signal, first means to phase modulate said reference signal to a degree nominally proportional to the magnitude of motion of said movable member, second means to further phase modulate said reference signal to a degree proportional to regular and recurring errors in the operation of said first means, and means to compare the phase of said command signal to the phase of said phase modulated reference signal to control the motion of said movable member.

8. Apparatus for measuring motion by phase modulating an electrical signal to a degree proportional to the magnitude of the mechanical motion of a first member relative to a second member comprising, a resolver having a field coil and a rotor coil, said field coil and said rotor coil each being mounted for independent rotation about a common axis fixed with respect to said second member, means to apply an input reference signal to said field coil, means to derive an output signal from said rotor coil, first mechanical means to rotate said rotor coil by a number of degrees nominally proportional to the motion of said first member relative to said second member, second mechanical means to rotate said field coil by a predetermined number of degrees to compensate for errors in the number of degrees by which said rotor coil is rotated by said first mechanical means in response to said motion, and means to compare the phase of said output signal derived from said rotor coil to the phase of a signal of known phase with respect to that of said reference signal to measure the actual amount of movement of said first member relative to said second member.

9. In an electrical resolver of the type having base means supporting a field coil system energized by a reference signal input and a rotor coil system mounted for free rotation with respect to said base and said field coil system and from which an output signal is derived the phase of which affords a measure of a quantity measurably represented by the degree of rotation of said rotor coil system with respect to said base, the improvement comprising means to mount said field coil system for free rotation with respect to said base, said rotor coil system being free to rotate with respect to both said base and said field coil system independently, and means to rotate said field coil system with respect to said base by an amount proportional to the error in measurement of said quantity by the degree of rotation of said rotor coil.

References Cited in the file of this patent
UNITED STATES PATENTS

| | | |
|---|---|---|
| 2,460,798 | McCarthy | Feb. 8, 1949 |
| 2,572,044 | McCarthy et al. | Oct. 23, 1951 |